R. HOWE.
INTERNAL COMBUSTION ENGINE.
APPLICATION FILED OCT. 24, 1919.

1,438,915.

Patented Dec. 12, 1922.

Inventor
Robert Howe
By James L. Norris,
Attorney.

Patented Dec. 12, 1922.

1,438,915

UNITED STATES PATENT OFFICE.

ROBERT HOWE, OF NEWCASTLE-UPON-TYNE, ENGLAND.

INTERNAL-COMBUSTION ENGINE.

Application filed October 24, 1919. Serial No. 332,970.

*To all whom it may concern:*

Be it known that I, ROBERT HOWE, a subject of the King of Great Britain, residing at Newcastle-upon-Tyne, Northumberland, England, have invented certain new and useful Improvements in or Relating to Internal-Combustion Engines, of which the following is a specification.

This invention relates to that class of internal combustion engine in which pipes through which cooling means pass are provided for cooling air in a chamber attached to the cylinder, the cooled air being compressed by the action of the piston before passing to the cylinder.

The object of this invention is to construct an internal combustion engine in such a manner that a sufficiently great weight or volume of compressed air, for use with the fuel charge, or as a scavenging charge, can be cooled for the purpose of obtaining a cool charge of highly compressed air which enters the combustion chamber under pressure and adiabatic expansion whilst the piston is completing its power stroke and before the exhaust valve is open and also during a portion of the piston's return stroke and whilst the exhaust valve is open and mixes with the products of combustion so that the products of a previous explosion are cooled as well as the working cylinder or cylinders and the piston or pistons and also forms a scavenging charge following the mixing period and also part of the succeeding charge for a following explosion and whereby the products of combustion of a previous explosion can be supplied to a turbine at a reduced temperature, if desired, and also to delay, as may be desired, the closing and opening of the exhaust valve or the fuel valve, respectively, whereby I obtain a complete scavenging of the products of combustion or allow of a smaller charge being employed, such delaying being effected by the pressure of air in the apparatus and not from an external source.

My invention will be clearly understood from the following description aided by the examples shown on the annexed drawings which show sufficient structure of an engine to illustrate the invention.

Figure 1:
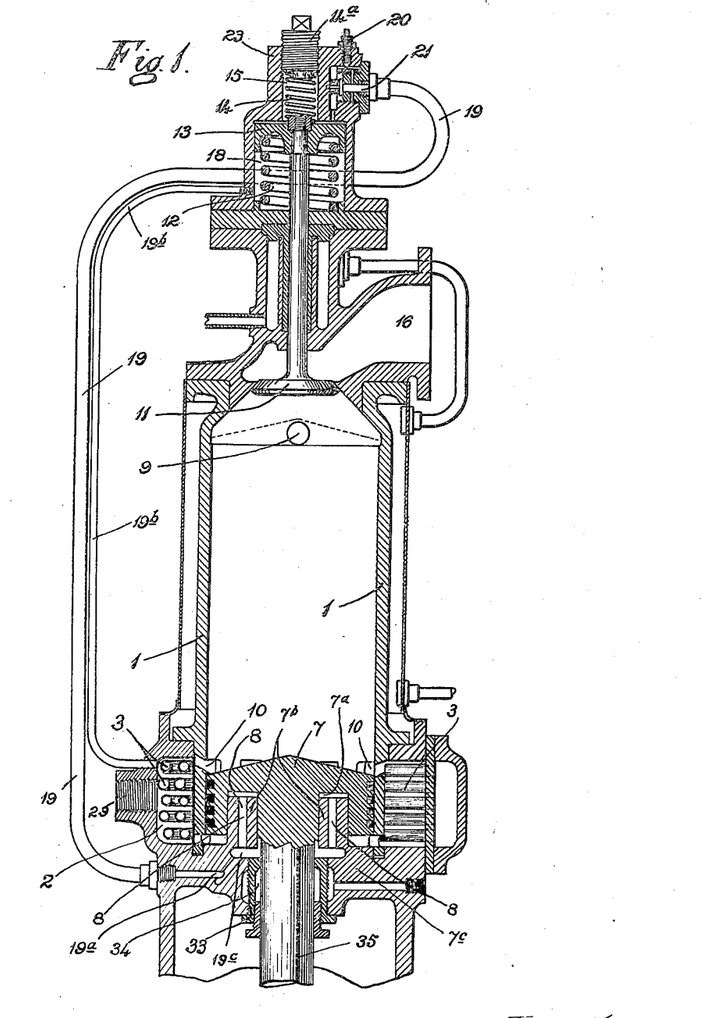
Figure 1 is a vertical section of the cylinder, piston and exhaust valve mechanism of an internal combustion engine and showing one cooling chamber connected with the working cylinder, means being provided in the piston and cylinder for operating the relay mechanism of the exhaust valve by air in the apparatus.
Figure 2:
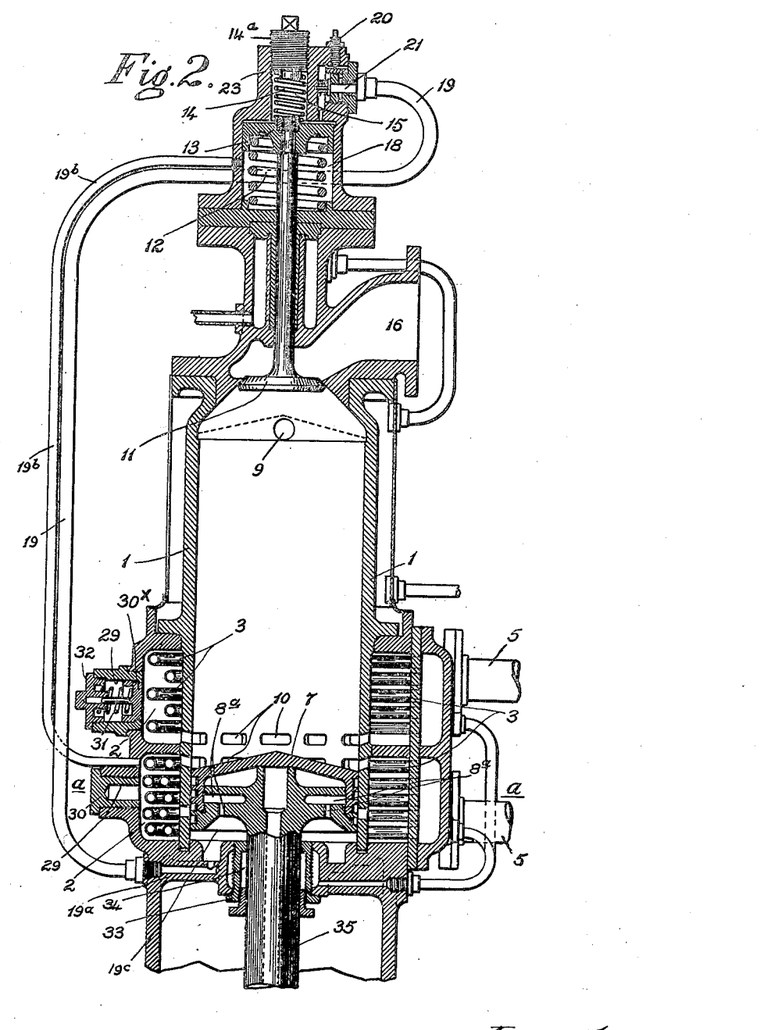
Figure 2 is a similar view to Figure 1 but showing two cooling chambers connected with the working cylinder, the relay mechanism of the exhaust valve being operable by the pressure in the end of the cylinder.
Figure 4:
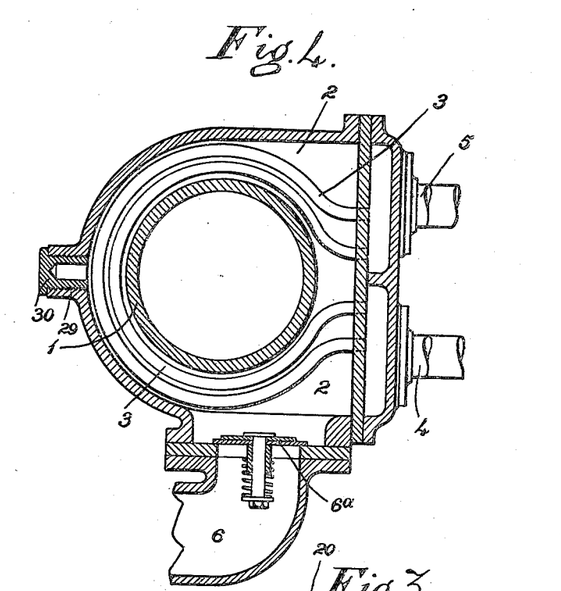
Figure 4 is a section on the line $a\ a$ of Figure 2.

In carrying out my invention as applied to say a single cylinder engine as at Figures 1 or 2 I surround one end or one end and part of the cylinder 1 with a chamber 2 as at Figure 1 in which I arrange a nest of pipes 3 or other cooling means connecting at 4 (see Fig. 4) with a water supply and outlet 5 and I also arrange an air conduit or supply pipe 6 as shown at Figure 4 to such chamber 2 such chamber 2 being controlled by a valve $6^a$ operated automatically, as will be understood from the construction shown in Figure 4, or controlled from some working part of the engine, the valve $6^a$ being closed during the working stroke of the engine.

In some cases I may have two cooling chambers as at Figure 2 of the same or varying capacities but such second chamber is positioned higher up the cylinder to further assist in the cooling, and the air from such second chamber would primarily act as a scavenging charge, this chamber being the first to be opened and such second chamber may be kept at a higher temperature than the other chamber. The letters of reference to this chamber and connections are the same as at Figure 1. Either or both chambers 2 may be positioned higher up the cylinder.

The end of the cylinder 1, Figure 2, is open to the air chamber 2 during the working stroke of the piston 7 and until the piston reaches the end of its stroke and the piston 7 may be made hollow as shown at Figure 2 and with openings $8^a$ connecting the hollow piston portion of the piston 7.

Connected with the apparatus is a pump (not shown) actuated for controlling the supply of fuel and such fuel may be cooled under pressure to reduce the resistance to compression and is forced into the cylinder at the inlet 9 at the end opposite the chamber end.

Ports 10 are provided between the air chamber or chambers 2 and the cylinder 1.

In the non-chamber end of the cylinder is positioned the exhaust valve 11 controlled by a spring 12 acting against a plunger 13 normally to close the valve 11 and above this spring 12 and plunger 13 I position an adjustable spring 14 controlled by a plug $14^a$ and acting on the plunger 13 and riding within a relay chamber 15 said second spring 14 having action to normally press the plunger 13 against the valve spring 12, the strength of the two springs 12 and 14 being proportioned for the purpose hereafter described, and I connect chamber 18 on the underside of the piston 13 and the air chamber 2 by a pipe $19^b$ and I connect the passage $19^a$ of the air chamber 2 by a pipe 19 with the relay chamber 18 on the opposite side of the plunger 13 for allowing the pressure of air in the cylinder air chamber 2 to be conveyed to and act on the underside of the plunger 13 to keep the valve 11 closed and to the upper side of the plunger 13 to open the valve 11 and keep the exhaust valve 11 open during a portion of the return stroke of the piston 7, the escape of air in the chambers 15, 18 being retarded by a valve 20 or other means to allow of the exhaust valve 11 having a damped closing movement at the end of its stroke as will be understood from Figure 2.

Figure 3:
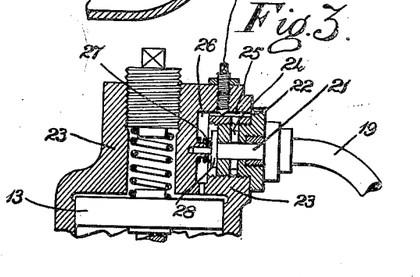
Figure 3 is an enlarged view of part of the exhaust valve mechanism shown at the top of Figures 1 and 2, such enlarged view being for the sake of clearness.

In the drawings, see enlarged view Figure 3, the pipe 19 is connected with a passage 21 made through a plug 22 screwed into a hole in the capping 23 provided with the two chambers 15, 18 and the plug 22 is provided with a passage 24 at right angles to the passage 21 and connecting with same and in the capping 23 and parallel with the hole 21 I position another hole 25 communicating with the passage 24 and with a space 26 at the end of the plug 21, such holes 25 being controlled by the valve 20 which consists of a pointed screw stem screwed into the capping. In the space 26 I position a spring 27 engaging and normally pressing a valve 28 against the end of the passage 21 to close the valve 28 against any pressure passing through the pipe $19^b$.

I provide the air chamber or chambers 2 surrounding the cylinder 1 with an auxiliary chamber 29 in which may be fitted a screw 30 as in the lower chamber 2, Figure 2, or a plunger $30^x$ controlled by a spring 31 held in place by a cap 32 as shown in the upper chamber 2, Figure 2, whereby the volume of the air chamber 2 can be adjusted to requirements of pressure of the air and also allow of a larger volume of air being taken into the air chambers 2, the screw or plunger being positionable by any means to determine the size of the auxiliary chamber 29 for ordinary use, and whilst the engine is running the movement of the screw or plunger allowing for the greater pressure of air.

I may increase and prolong the pressure in the relay chamber to keep the exhaust valve open during a period necessary for fully clearing the products of combustion from the cylinder and the passing of a scavenging charge through the cylinder whereby the piston may reach a position nearer the end of its compression stroke before the exhaust valve is closed so that it effects the compression during only a portion of its stroke instead of the whole length so that I obtain a less combustion chamber ratio to the cylinder swept and as a result obtain a more complete adiabatic expansion due to the following explosion and further I may inject the cooled fuel under pressure or near the end of the piston's stroke to mix with air already in the cylinder such fuel being at a pressure exceeding the pressure of air in the cylinder whereby a charge of small volume is obtained which when fired the products of combustion will be more completely expanded owing to the smaller charge than in the case of a piston compressing a full charge during the whole of its stroke.

The compression of the air passing to the relay chambers connected with the exhaust and fuel valves may be effected by the working piston or by an additional smaller piston on the piston rod.

To provide pressure means other than by the piston itself as at Figure 2 to operate and to prolong the opening of the relay actuated valve 11 and to allow of a complete scavenging of the cylinder and a smaller charge being employed I construct the underside of the piston as at Figure 1 with a ring recess $7^a$ which engages a ring projection $7^b$ on end or base $7^c$ of the cylinder 1 such ring projection $7^b$ being provided with holes 8 which communicate with the pipe 19 so that as the piston 7 moves towards the end of explosion stroke and compresses the air contained within that end of the cylinder, Figure 1 below the ring projection $7^b$ the pressure continues to increase but just as the piston reaches the ring projection $7^b$ the recess 7ᵃ in piston engages and moves down the ring projection compressing the fluid within the piston recess or annulus and this creates a greater pressure than would be the case in Figure 2 in the space 19ᶜ and relay 15 to operate the valve 11 this pressure continuing until on the return of the piston the ring projection is freed from the recess or cylinder when the pressure in the relay chamber is reduced as previously described.

During this engagement of the piston with the ring projection the chamber 2 has been cut off from the pipe 19 so that the fluctuations of pressure in the chamber 2 do not affect the relay appliance.

Figure 5:
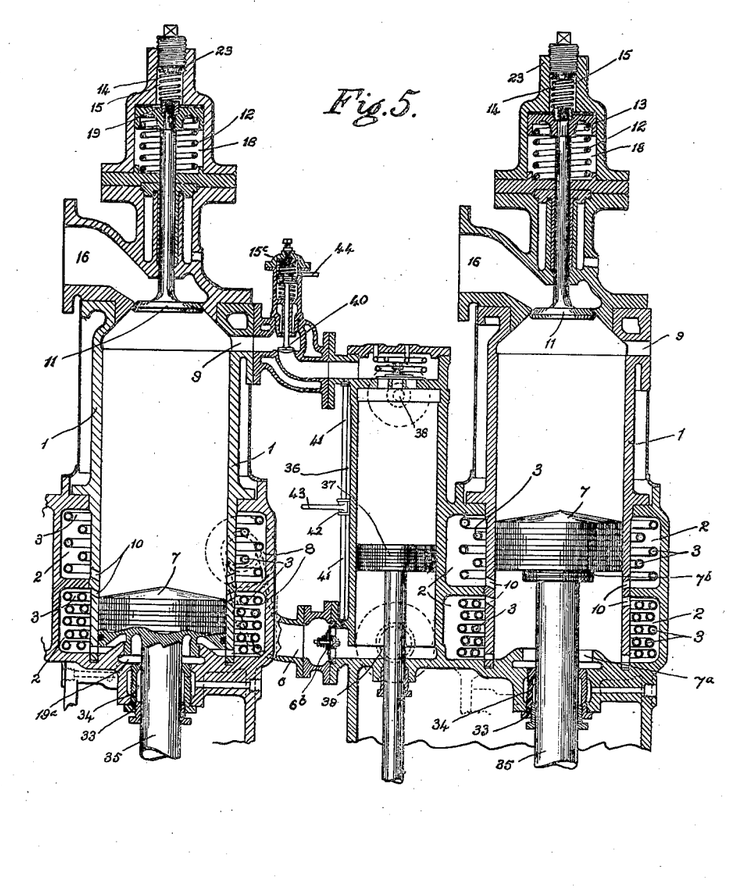
Figure 5 is a vertical section of two cylinders one having a fuel or air and fuel pump connected thereto and showing the connection of the pump to the second cylinder.

Instead of the piston having a recess it may have a ring projection 7ᵇ and the end of the cylinder be formed with the recess 7ᵃ as at the right hand side of Figure 5.

Figure 6:
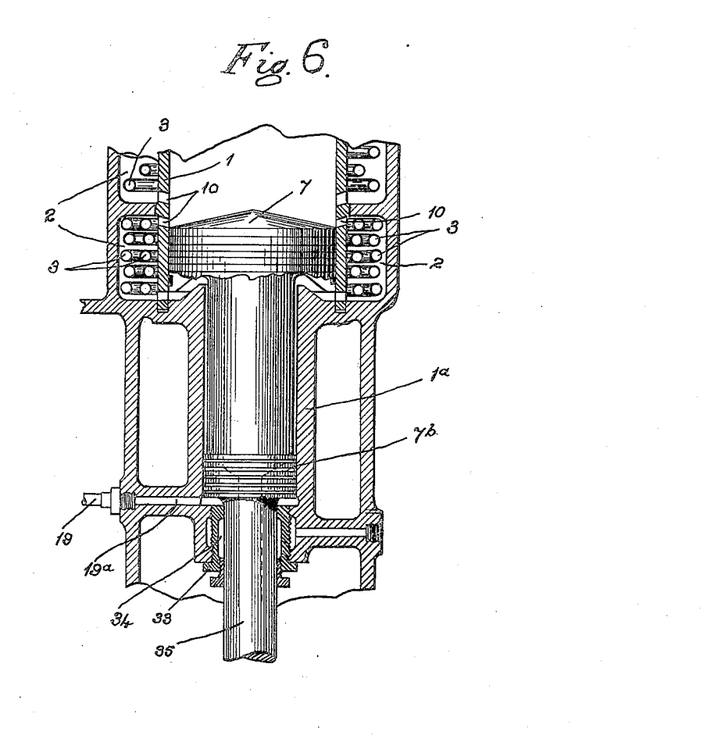
Figure 6 is a sectional elevation of a portion of an engine and showing two cylinders and two pistons on the one piston rod, one piston and cylinder being of smaller diameter and length for compression of air, other than cooled air, to control the exhaust and fuel valves. This construction may be used in substitution to that shown in Figure 5.

Instead of constructing the underside of the piston as shown at Figures 1 and 5 I may form the cylinder 1 with a second shorter and smaller cylinder 1ᵃ and also form a second or smaller piston 7ᵇ on the piston rod and connect the relay cylinder by the pipe 35 and connect the relay cylinder by the pipe 19 with the passage 19ᵃ at the end of such cylinder 1ᵃ as shown at Figure 6 in which case the air in the cylinder 1ᵃ and passage 19ᵃ is compressed and the same but more gradual effect on the opening of the exhaust valve is obtained as with the devices shown in Figures 1 and 5.

By the employment of a small piston 7ᵇ as shown at Figure 6 when the main piston has completed about half of its explosion stroke and the small piston has entered its cylinder, and thereby imprisoned in the smaller cylinder 1ᵃ a volume of uncooled air at the pressure then existing in the main cylinder and air chambers, an independent pressure means and separate from chamber 2 is provided for actuating the relay valves. Also it will be understood that when this small piston 7ᵇ leaves its cylinder 1ᵃ on the return stroke, the air pressure in pipe 19 will decrease more gradually and over a longer period of time to a lower pressure than that which existed in the main cylinder at the time of engagement on the explosion stroke, but with not so abrupt a change of pressure in the passage 19ᵃ and pipe 19 and relay chambers 15 and 15ᶜ as would be the case with the other constructions, Figures 1, 2 and 5.

In action and assuming that the piston 7, Figures 2 or 5 is just starting its working stroke, air having filled the cylinder and air chamber or chambers 2 and all valves being closed, the piston 7 moves under the explosion and in so doing compresses the air in the cylinder and air chamber and chambers 2, the gases expand in the cylinder 1 and when the piston covers the first row of ports 10 of the chamber 2 it compresses the air in chambers 2 and at the end of the cylinder under the piston, and the pressure is transmitted by the pipe 19ᵇ to the chamber 18 to act on the plunger 13 to keep the valve 11 closed. When the piston has covered the second row of ports 10, the rate of increase of pressure in the lower air chamber 2 and cylinder and end passage 19ᵃ is still further increased both rows or ports being covered and on a further movement of the piston the first row of ports is uncovered and the third row covered and immediately afterwards the second row of ports is uncovered and the cooled air from the chambers immediately expands and passes into the cylinder to mix with the products of combustion. The cylinder end is now isolated from the air in the lower cooling chamber 2, and is subjected to a still further increased acceleration of pressure which acting upon the plunger 13 through the pipe 19 will open the valve, owing to the fact that the pressure in the pipe 19 exceeds the pressure in the pipe 19ᵇ which has been materially reduced by the cooled air passing to the cylinder and this opening of the valve occurs just before the completion of the working stroke of the piston. The contents of the cylinder, a mixture of cooled gases will now pass through the exhaust valve at a still further reduced temperature, due to adiabatic expansion from the pressure in the cylinder at the moment of release, and such mixture of reheated and cooled gases may be used in a turbine if so desired.

The pipe 19ᵇ may be connected to either chamber 2 as its object is principally to assist the spring 12 in holding the valve 11 closed and thus determining the timing of the opening of the valve 11.

The passage of air through the cylinder has cleared out all or a greater portion of the products of combustion leaving a volume of cooled air and a proportion of cooled gases in the cylinder 1 and on the return movement of the piston 7 fresh air is drawn into the cylinder air chamber or chambers 2. A charge of cooled fuel or mixture of air and fuel has been injected into the cylinder 1 by the pump and the air and fuel in the cylinder which have become mixed is compressed ready for firing on the return or firing stroke of the piston 7 when a repeat operation takes place.

The springs 12, 14 connected with the plunger and the exhaust valve act in opposite directions, the valve spring 12 under the relay plunger 13 assisting in closing the valve, and the other spring 14 being for the purpose of adjusting the effective strength of the spring 12.

Now by cooling the contents of the chambers 2, which contents having been cooled under a measure of isothermal cooling, the working cylinder is, when the ports 10 are uncovered to the explosive side of the piston, supplied with a volume of cooled air from such chambers and on entering the cylinder by adiabatic expansion to a lower pressure mixes with the products of combustion, absorbs a greater quantity of heat therefrom and cools same as well as the piston, the cylinder walls and combustion chamber and exhaust valve.

The valve 6$^a$ controlling the air inlet to the chamber is automatic or is opened just at the commencement of the return stroke of the piston 7 and closed at the commencement of the working stroke.

The auxiliary pump 36, Figure 5, may be double acting and arranged in such a manner that one side may supply a rich cooled or uncooled fuel, or a mixture of air and fuel to the combustion chamber of the cylinder, and the other side supply air to either cylinder air chamber and such pump may be provided with means such as a pipe 41 and a non-return valve connecting the two ends of the pump cylinder 36, said pipe having a non-return valve 42 operated by an adjustable lever 43 whereby the richness of the fuel or mixture can be varied by a transference of air from the air side of the piston 37 to the rich fuel side of the piston 37.

I may provide the piston rod stuffing box 33 with a recess, chamber or conduit 34, through which the cooling means may be caused to pass to assist in keeping the piston rod 35 cool.

The double acting pump may be larger than necessary so that extra air may be passed through the cylinder and such air with any remaining products of combustion may be usefully employed in operating an auxiliary turbine.

By the construction such as Figure 2 I am able to obtain air pressure in the cylinder chamber 2 at the end of the firing stroke, equal to, or approximating the amount of compression in the combustion chamber prior to ignition thus obtaining a well balanced engine.

The pump 36, see Figure 5, is double acting or performs a double function. The piston 37 in its downward stroke draws in the fuel through a valve controlled inlet 38 on the upper side and forces air into the air chambers 2 from the underside whilst at the upward stroke it draws in air through the valve controlled inlet 39 and the upper side forces the fuel into the cylinder 1 through the usual valve fitted at the end of the cylinder and past a cooling means if provided and then through the non-return relay controlled valve 40, by the inlet 9, the valves 38, and 39 being so constructed that they are closed during the pressure strokes of the piston 37 whilst the valve 6$^b$ is open on the downward pressure stroke of the piston 37.

The valve 40 is connected to a similar relay mechanism as the valve 11 such valve 40 being opened by and when the pressure of the fuel or mixture on the underside of the valve 40 is greater than the effect of the air on the relay plunger to which the valve is connected and such relay mechanism is connected by a pipe 44 to the pipe 19 so that the pressure conveyed by the pipe 19 to the top side of the relay plunger and retarded by the valve 20 will keep the valve 40 closed until such pressure is released through the passage 24 when the fuel mixture can be passed to the combustion end of the cylinder in the manner and for the purpose hereinbefore described.

As shown at Figure 5 the air side of the pump piston 37 connects with the upper chamber 2 only so that as the piston 7 in the cylinder 1 opens the port 10 of such chamber, (the piston 37 having previously effected a compression in the upper chamber and on the air side of the piston) an increased pressure and volume of air from said chamber will pass into the cylinder 1, the pressure and volume being greater than that provided by the piston 7 alone.

By proportioning the capacity of the chamber provided with the cooling means in relation to the cylinder I can obtain air at a pressure of two, three or more atmospheres for use with fuel as an explosive charge in the combustion chamber or for the purpose of actuating the exhaust or fuel valves in due time and sequence.

By this invention I am enabled to supply such a weight of cooled air necessary for reducing the temperature of the products of combustion that the temperature of such products will not be deleterious to an elastic fluid turbine.

What I do claim as my invention and desire to secure by Letters Patent is:—

1. In an internal combustion engine, a cylinder having inlet and exhaust valves, a piston in said cylinder and means controlled by the relative pressures in the cylinder on opposite sides of said piston for opening said exhaust valve just before the end of the explosion stroke of the piston.

2. In an internal combustion engine, a cylinder having inlet and exhaust valves, a piston in said cylinder, means controlled by the relative pressures in the cylinder on opposite sides of said piston for opening said exhaust valve just before the end of the explosion stroke of the piston and devices for delaying the closing of said exhaust valve.

3. In an internal combustion engine, a cylinder having a working end provided with inlet and exhaust valves and a pump end, a piston in said cylinder, a jacket about said cylinder forming therewith an air chamber, ports in said cylinder affording communication between said chamber and the interior of the cylinder, said piston controlling said ports and adapted to compress air in the pump end of the cylinder independently of said air chamber, a pressure controlled plunger mounted on said exhaust valve, a connection from said chamber to one side of said plunger, and a connection from the pump end of said cylinder to the opposite side of said plunger whereby said exhaust valve is opened by the relative pressures in the cylinder on opposite sides of the piston as the piston approaches the end of the explosion stroke.

4. In an internal combustion engine, a cylinder having a working end provided with inlet and exhaust valves and a pump end, a piston in said cylinder, a jacket about said cylinder forming therewith an air chamber, ports in said cylinder affording communication between said chamber and the interior of the cylinder, said piston controlling said ports and adapted to compress air in the pump end of the cylinder independently of said air chamber, a pressure controlled plunger associated with said exhaust valve, a connection from said chamber to one side of said plunger, a connection from the pump end of said cylinder to the opposite side of said plunger whereby said exhaust valve is opened as the piston approaches the end of the explosion stroke and a valve for restricting the exhaust from said opposite side of the plunger for delaying the closing of said exhaust valve.

5. In an internal combustion engine, a cylinder having a chamber communicating with the interior of the cylinder through a plurality of ports, a piston operating within said cylinder adapted to cover and uncover said ports whereby air is compressed in said chamber on the working stroke of said piston, means within the chamber for cooling said compressed air and means for controlling the capacity of said chamber.

6. In an internal combustion engine, a cylinder having inlet and exhaust valves and a series of air inlet ports, a piston in said cylinder, a jacket mounted on said cylinder forming therewith an air chamber having communication with the interior of said cylinder through said ports when uncovered by the piston whereby air is compressed in said chamber on the working stroke of the piston, means in said chamber for cooling said compressed air, an auxiliary cylinder adjacent said exhaust valve, a plunger connected to said exhaust valve adapted to reciprocate in said auxiliary cylinder, a connection from said chamber to said auxiliary cylinder for communicating pressure to one side of the plunger tending to maintain said exhaust valve closed and means for augmenting the air pressure toward the end of the working stroke of the piston and conveying the same to the other side of the plunger for opening the exhaust valve.

7. In an internal combustion engine, a cylinder, a chamber adapted to communicate with the interior of the cylinder through a series of ports, a piston within the cylinder, an air inlet communicating with said cylinder whereby air may be drawn into the cylinder during the compression stroke of the piston and compressed into said chamber on the working stroke, a series of pipes within the chamber having a cooling medium passing therethrough for cooling said compressed air, an exhaust valve, a valve spring normally tending to close said exhaust valve, a plunger connected to said exhaust valve and controlled by fluid pressure, a connection from one side of said plunger to said compressed air chamber, a spring acting on said valve to open the same, a connection from the opposite side of said plunger to the pump end of the cylinder and means for augmenting the air pressure in said last named connection toward the end of the piston stroke for opening said exhaust valve.

8. In an internal combustion engine, a cylinder having a combustion chamber at one end and a pump chamber at the other, an intermediate air chamber communicating with the cylinder through a series of ports, and a piston in said cylinder adapted to compress air in said air chamber and in said pump chamber at a higher pressure, an auxiliary cylinder and plunger associated with said exhaust valve, a spring acting on said plunger within the auxiliary cylinder to normally close said valve, a relay chamber communicating with said auxiliary cylinder and containing a spring acting on said plunger to normally open said exhaust valve, a connection between said air chamber and said auxiliary chamber on one side of said plunger, a valve controlled pipe connecting the pump end of the cylinder with said auxiliary chamber on the opposite side of said plunger, and a second valve connecting the auxiliary cylinder with the pipe whereby the closing of the exhaust valve may be delayed.

9. In an internal combustion engine, a cylinder having a combustion chamber at one end, a pump chamber at the other end and an intermediate air chamber communicating with the interior of said cylinder through a series of ports, an exhaust valve controlled by the differential pressures in said air and pump chambers and means for controlling the duration of said differential pressure to keep said exhaust valve open for a predetermined period to allow a complete scavenging of the cylinder by the air from said air chamber.

10. In an internal combustion engine, a cylinder having a combustion chamber at one end, a pump chamber at the other end and an intermediate air chamber communicating with the interior of said cylinder through a series of ports, an exhaust valve controlled by the differential pressures in said air and pump chambers, means for supplying fuel under pressure to said combustion chamber, and an inlet valve controlled by the differential pressures in said pump chamber and said means whereby said inlet valve is kept closed and said exhaust valve open for a predetermined period to allow a complete scavenging of the cylinder by the air from said air chamber.

In testimony whereof I have hereunto set my hand in presence of two subscribing witnesses.

ROBERT HOWE.

Witnesses:
RICHARD COXE GARDNER,
FRED M. ASHIRP.